United States Patent
Kippie et al.

(10) Patent No.: US 8,596,360 B2
(45) Date of Patent: Dec. 3, 2013

(54) GRAVEL PACK CARRIER FLUIDS

(75) Inventors: David P. Kippie, Katy, TX (US); James Fredrick Donham, Mangaf (KW)

(73) Assignee: M-I L.L.C., Houston, TX (US)

(*) Notice: Subject to any disclaimer, the term of this patent is extended or adjusted under 35 U.S.C. 154(b) by 0 days.

(21) Appl. No.: 13/526,096

(22) Filed: Jun. 18, 2012
(Under 37 CFR 1.47)

(65) Prior Publication Data
US 2013/0068459 A1    Mar. 21, 2013

Related U.S. Application Data

(63) Continuation of application No. 13/319,099, filed as application No. PCT/US2010/033969 on May 7, 2010, now abandoned.

(60) Provisional application No. 61/176,782, filed on May 8, 2009, provisional application No. 61/177,892, filed on May 13, 2009.

(51) Int. Cl.
*E21B 43/04* (2006.01)
*C09K 8/80* (2006.01)
*C09K 8/575* (2006.01)

(52) U.S. Cl.
USPC ............................ 166/278; 166/300; 507/209

(58) Field of Classification Search
None
See application file for complete search history.

(56) References Cited

U.S. PATENT DOCUMENTS

| | | | |
|---|---|---|---|
| 4,533,487 A | 8/1985 | Jones | |
| 4,945,991 A | 8/1990 | Jones | |
| 5,458,197 A | 10/1995 | Chan | |
| 6,090,754 A | 7/2000 | Chan et al. | |
| 7,134,496 B2 | 11/2006 | Jones et al. | |
| 2004/0023818 A1 | 2/2004 | Nguyen et al. | |
| 2005/0139354 A1 | 6/2005 | Salamat | |
| 2006/0073986 A1 | 4/2006 | Jones et al. | |
| 2006/0211775 A1 | 9/2006 | Crews | |
| 2006/0272815 A1 | 12/2006 | Jones et al. | |
| 2007/0256836 A1 | 11/2007 | Welton et al. | |
| 2008/0076682 A1 | 3/2008 | Jones et al. | |
| 2008/0096774 A1 | 4/2008 | Tabary et al. | |
| 2008/0110618 A1 | 5/2008 | Quintero et al. | |

FOREIGN PATENT DOCUMENTS

WO    2008/045734 A3    6/2008
WO    2008089262 A1    7/2008

OTHER PUBLICATIONS

Patent Examination Report No. 1 dated Aug. 22, 2012 in corresponding Australian application No. 2010245753 (4 pages).
International Search Report from PCT/US2010/033969 dated Jan. 20, 2011 (2 pages).
Supplementary European Search Report issued Oct. 25, 2012 in corresponding EPO application No. 10772863.6 (8 pages).

*Primary Examiner* — Zakiya W Bates
(74) *Attorney, Agent, or Firm* — Osha Liang LLP

(57) ABSTRACT

A method of gravel packing a hole in a subterranean formation having a filter cake coated on the surface thereof is disclosed. The method may include: injecting into the hole a gravel pack composition comprising gravel and a carrier fluid comprising a base fluid and at least one alkyl glycoside. Also disclosed is a solution including an aqueous fluid, at least one alkyl glycoside, and gravel which may be used as a composition for a gravel pack operation, for example.

20 Claims, No Drawings

GRAVEL PACK CARRIER FLUIDS

CROSS-REFERENCE TO RELATED APPLICATIONS

This application, pursuant to 35 U.S.C. §120, claims benefit to U.S. patent application Ser. No. 13/319,099, filed on Nov. 7, 2011, which claims priority to PCT/US2010/033969 filed May 7, 2010, which claims priority to both U.S. Provisional Patent Application No. 61/176,782, filed May 8, 2009, and U.S. Provisional Patent Application No. 61/177,892, filed May 13, 2009. All applications are hereby incorporated by reference.

BACKGROUND OF DISCLOSURE

1. Field of the Disclosure

Embodiments disclosed herein relate generally to compositions and methods used in completing a well. In particular, embodiments disclosed herein relate to compositions and methods used in gravel packing operations.

2. Background

During the drilling of a wellbore, various fluids are typically used in the well for a variety of functions. The fluids may be circulated through a drill pipe and drill bit into the wellbore, and then may subsequently flow upward through wellbore to the surface. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, emplacing a packer, abandoning the well or preparing the well for abandonment, and otherwise treating the well or the formation.

Once the well has been drilled and a target reservoir has been encountered, the well is ready to be completed. Typically, target formations are completed in one of two ways: cased hole completion technique or an uncased completion technique. The technique for completing a well is dependent on several factors, which are known to those skilled in the art of completing target reservoirs. For an cased hole completion, it is common practice to run a string of casing into the well bore, cement the casing to the target reservoir, displace the drilling fluid to a clear, solid-free, non-damaging completion fluid by using a series of wash/dispersing chemicals, and then run the production tubing inside the casing. Once the casing is clean from solids/debris and filled with completion fluid, perforations are typically created to extend through the casing string, through the cement that secures the casing string in place, and a short distance into the formation. These perforations may be created by detonating shaped charges carried in a perforating gun. The perforations created cross one or more target zones to allow fluids to enter the interior of the wellbore (in the case of a production well) or be injected down the production tubing and into the reservoir (in the case of an injection well).

After the well is perforated, a stimulation or sand control treatment process may be performed. Sand control processes may prevent, after the well is completed and placed in production, formation sand from unconsolidated formations being swept into the flow path along with formation fluid, which erodes production components in the flow path. Similarly, in uncased boreholes or openhole completions, where an open face is established across the target zone, formation sand from unconsolidated formations may also be swept into the flow path along with formation fluid.

Thus, with either cased or uncased well bores, one or more sand screens may be installed in the flow path between the production tubing and the rock face in the producing reservoir. Additionally, the annulus around the screen may be packed with a relatively coarse sand or gravel into the void between the reservoir rock and the outside of the screen, to act as a filter to reduce the amount of fine formation sand reaching the screen, to support the porous medium of the producing reservoir so that it will not collapse into the void between the reservoir rock and the outside of the screen and to seal off the annulus in the producing zone from non-producing formations. When the sand tries to move through the gravel, it is filtered and held back by the gravel and/or screen, but formation fluids continue to flow unhindered (by either the gravel or screen) into the production string.

In deep wells, reliability of the sand face completion is very important, due to the prohibitively high cost of intervention. Further, as many such wells are completed open hole and in relatively incompetent rock, gravel packing of open-hole horizontal wells is increasingly becoming a standard practice in the deep-water, sub-sea completion environment. The gravel packing process involves mixing gravel with a carrier fluid, and pumping the slurry down the tubing and through the cross-over, thereby flowing into the annulus between the screen and the wellbore. The carrier fluid in the slurry leaks off into the formation and/or through the screen. The screen is designed to prevent the gravel in the slurry from flowing through it and entering the production tubing. As a result, the gravel is deposited in the annulus around the screen where it becomes tightly packed, forming a "gravel pack." Thus, gravel is deposited adjacent an open hole where it serves to prevent sand and other formation fines from flowing into the wellbore.

Proper selection of the carrier fluid is essential to a gravel packing process. Ideally, the carrier fluid shall not cause any permeability reduction of the formation. When viscous fluids are used, carrier fluid must also have sufficient viscosity to suspend and carry the gravel during placement. Carrier fluids are either considered "water-based" or "oil-based" depending on the constituency of their external continuous phase. Aqueous-base fluids can be tailored to be compatible with most formations simply by including salts such as potassium chloride, ammonium chloride, or tetramethyl ammonium chloride. Consequently, to date, the convention in gravel-packing horizontal wells has been water packing or shunt-packing with water-based viscous fluids comprising a brine, a gelling agent such as hydroxyethylcellulose (HEC), gums (xanthan or guar), or a viscoelastic surfactant, and breakers to minimize the pressure required to move the fluid back to the wellbore.

Accordingly, there exists a continuing need for developments in carrier fluids for gravel packing processes.

SUMMARY OF THE DISCLOSURE

In one aspect, embodiments disclosed herein relate to a method of gravel packing a hole in a subterranean formation having a filter cake coated on the surface thereof. The method may include: injecting into the hole a gravel pack composition comprising gravel and a carrier fluid comprising a base fluid and an alkyl glycoside.

In another aspect, embodiments disclosed herein relate to a method of gravel packing a hole in a subterranean formation having a filter cake coated on the surface thereof. The method may include: injecting into the hole a gravel pack composition comprising gravel and a carrier fluid comprising: a base fluid having a non-oleaginous external phase and an oleaginous internal phase; and at least one surfactant.

In another aspect, embodiments disclosed herein relate to a solution, including an aqueous fluid, at least one alkyl glycoside, and gravel. The solution may be used as a composition for a gravel pack operation, for example.

Other aspects and advantages will be apparent from the following description and the appended claims.

DETAILED DESCRIPTION

Embodiments disclosed herein relate generally to compositions and methods used in completing a well. In particular, embodiments disclosed herein relate to compositions and methods used in gravel packing operations and/or proppant transport operations, where the proppant may include sand or ceramic proppants, among others.

Carrier Fluid

The carrier fluids of the present disclosure may include a base fluid and at least surfactant, such as an alkyl glycoside. Alkyl glycosides are non-ionic, generally biodegradable surfactants. Glycosides are substituted saccharides in which the substituent group is attached, through an oxygen atom, to the aldehyde or ketone carbon. Accordingly, glycosides are considered acetals. As with the term "saccharide," the term "glycoside" defines neither the number nor the identity of the saccharide units in the molecule. To describe the identity of the saccharide units, it is common to modify the name of the saccharide unit by adding the ending "-side." For example, a glucoside is a glycoside having one or more glucose units and a fructoside is a glycoside having one or more fructose units. Surfactants may be used, for example, at a concentration in the range from about 0.01% to about 15% by volume, based on a total amount of the base fluid and the surfactant, and may promote the formation of a stable emulsion or suspension.

Alkyl glycoside nonionic surfactants used as a cleaning agent in accordance with the present disclosure may have the formula RO—(R'O)$_x$Z$_y$ where the letter O represents an oxygen atom and R, R', x, Z, and y are as described below:

R represents a monovalent alkyl radical containing from 6 to 25 carbon atoms. The term "alkyl radical" is used herein to include aliphatic or alicyclic. In other words, the alkyl radical may be straight-chain or branched, saturated or unsaturated, and may contain carbon, hydrogen, oxygen, etc. In a particular embodiment, the alkyl groups are straight-chain saturated hydrocarbon radicals containing 8 to 16 carbon atoms.

R' represents a divalent alkyl radical containing 2 to 4 carbon atoms where the term "alkyl radical" is used as discussed above. The group (R'O) represents an oxy-alkylene repeating unit derived generally from ethylene oxide, propylene oxide, or butylene oxide.

The letter x represents the number of oxy-alkylene units in the alkyl glycoside, and may vary from 0 to about 12. Oxy-alkylene units may be added to an alcohol prior to reaction with the saccharide (discussed below) as a way to obtain or vary the desired chain length for the alkyl portion of the glycoside.

Z represents a reducing saccharide moiety containing 5 or 6 carbon atoms, and y represents the number of saccharide units in the glycoside. The length of a saccharide chain is commonly described either by adding a descriptive prefix to its name (e.g., monosaccharide, disaccharide, etc.) or by stating the chain's "degree of polymerization" (abbreviated as DP) as a numerical value representing the number of saccharide units bonded together to form a chain. Monosaccharides are polyhydroxy aldehydes and polyhydroxy ketones which, when unsubstituted, have the chemical formula $C_nH_{2n}O_n$. Monosaccharides can join together or polymerize, with the loss of water, to form chains of varying lengths and saccharide units. For example, glucose (also known as dextrose) is a monosaccharide (DP=1); sucrose and maltose are disaccharides (DP=2); and starch and cellulose are polysaccharides having (DP=1000 or more).

Thus, glycosides encompass unsubstituted and substituted molecules of any chain length. such as, for example, glucose, galactose, mannose, xylose, arabinose, fructose, etc. as well as materials which are hydrolyzable to form monosaccharides such as lower alkyl glycosides (e.g. a methyl glycoside, an ethyl glycoside, a propyl glycoside, a butyl glycoside, etc.), oligosaccharides (e.g. sucrose, maltose, maltotriose, lactose, xylobiose, melibiose, cellobiose, raffinose, stachyose, etc.) and other polysaccharides. However, the degree of polymerization affects the surface activity of the glycoside (by increasing the hydrophilic portion of the molecule). Generally, surface activity of an alkyl glycoside is maximized when the hydrophilicity of the saccharide chain balances the lipophilicity of the alkyl chain. Thus, in a particular embodiment in which the alkyl groups have 10 to 16 carbon atoms, the average DP may be selected to range from about 1.0 to 5.0, from about 1.2 to 3.0 in another embodiment, and from about 1.3 to 1.8 in yet another embodiment.

Alkyl glycosides may be prepared by reacting an alcohol of the type and chain length which is desired to form the "alkyl" portion of the glycoside of interest with a saccharide reactant (e.g., a monosaccharide such as glycose, xylose, arabinose, galactose, fructose, etc., or a polysaccharide such as starch, hemicellulose, lactose, maltose, melibiose, etc.) or with a glycoside starting material wherein the aglycone portion thereof is different from the alkyl substituent desired for the ultimate alkyl glycoside product of interest. Typically, such reaction is conducted at an elevated temperature and in the presence of an acid catalyst. An example reaction pathway for formation of an alkyl polyglucoside is shown below:

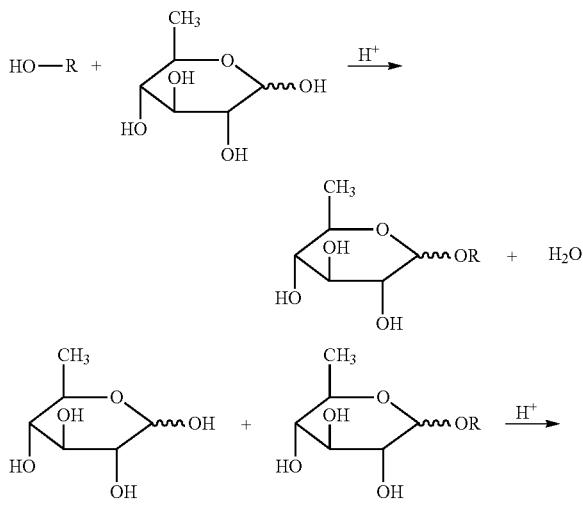

-continued

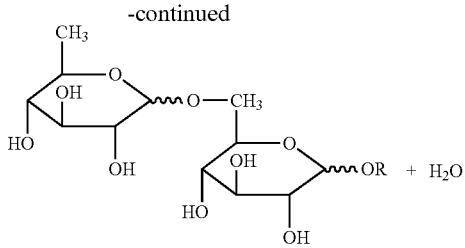

The molar ratio of alcohol to monosaccharide in the reaction mixture can vary widely but is typically between about 1.5:1 to about 10:1, and preferably between about 2.0:1 to about 6.0:1. The particular molar ratio chosen depends upon the desired average degree of polymerization (DP) of the monosaccharide reacted with the alcohol. Preferably, the ratio of alcohol to monosaccharide will be chosen to allow the production of an alkyl glycoside product having a DP between about 1.0 to about 5.0, from about 1.2 to about 3.0 in another embodiment, and from about 1.3 to about 1.8 in yet another embodiment.

The term "HLB" (Hydrophilic Lipophilic Balance) refers to the ratio of the hydrophilicity of the polar groups of the surface-active molecules to the hydrophobicity of the lipophilic part of the same molecules. An HLB value of 0 corresponds to a completely hydrophobic molecule, and a value of 20 would correspond to a molecule made up completely of hydrophilic components. Thus, depending on the alkyl chain length and the DP selected, the HLB may correspondingly vary. In a particular embodiment, the HLB value of the surfactant may range from 9.5 to 15 (and from about 11 to 14 in another embodiment) for desired cleaning action of the borehole surface and to render the borehole surface water-wet (when transitioning to a water-based fluid).

In addition to alkyl glycosides, other surfactants that may be suitable for use in the gravel pack carrier fluids of the present disclosure include sorbitan esters, ethoxylated alcohol, phenols, alkyl alkanolamide ethoxylate, alkyl poly (ethylene oxide), alkyl phenol poly (ethylene oxide), fatty alcohols, cocoamide MEA or mixtures thereof.

In different embodiments of the present disclosure, the gravel pack carrier fluid may be a water-in-oil emulsion (also referred to as an invert emulsion), an oil-in-water emulsion (also referred to as a direct emulsion) or water based. In a particular embodiment, the gravel pack carrier fluid may be an oil-in-water or direct emulsion. Preferably the gravel pack carrier fluids may have a density that is sufficient to allow the fluid to control the well during well completion operations, since open-hole gravel packing is done almost exclusively in circulating position. Typical fluid densities for the carrier fluid are from about 6.0 ppg (pounds per gallon) up to about 19.2 ppg, more preferably about 6.0 ppg up to 14.2 ppg. In a particular embodiment, the carrier fluid may have a density of at least 11 ppg.

Rheology of the gravel pack carrier fluid may also be an important variable when selecting the carrier fluids. Rhelogical properties of carrier fluids may be measured using a Fann 35 viscometer, and when measured at 300 rpm and 120° F., carrier fluids according to embodiments disclosed may have a measured value of 15 or less; 12 or less in other embodiments; 11 or less in other embodiments; and 10 or less in yet other embodiments.

As noted above, in one embodiment the carrier fluid may contain a base fluid and at least one alkyl glycoside or other surfactant. The base fluid may contain at least one oleaginous fluid or non-oleaginous fluid (or aqueous fluid). For example, the carrier fluid may be a direct emulsion (non-oleaginous external phase and oleaginous internal phase), an invert emulsion (oleaginous external phase and non-oleaginous internal phase) or a water-based fluid (no oleaginous phase). In a particular embodiment, the carrier fluid may be a direct emulsion, whereby the surfactant (including an alkyl glycoside) may stabilize the oleaginous internal phase within the non-oleaginous external phase. Additionally, the surfactant may also act to generate viscosity to carry gravel and/or proppant, such as sand or a ceramic proppant, down a wellbore.

The oleaginous fluid used for formulating the direct or invert emulsion fluids of the present disclosure are liquids and are more preferably a natural or synthetic oil and more preferably, the oleaginous fluid is selected from the group including diesel oil, mineral oil, synthetic oils such as ester based synthetic oils, polyolefin based synthetic oils (i.e., saturated and unsaturated polyalpha olefin, saturated and unsaturated long chain internal olefins), polydiorganosiloxanes, siloxanes or organo-siloxanes, and mixtures thereof and similar compounds that should be known to one of skill in the art.

The non-oleaginous fluid used in the formulation of the invert emulsion based fluids is a liquid and preferably is an aqueous liquid. The aqueous fluids used in the carrier fluids may be selected from the group including sea water, a brine containing organic and/or inorganic dissolved salts, liquids containing water-miscible organic compounds and combinations thereof and similar compounds that should be known to one of skill in the art. Brines suitable for use as the base fluid of the carrier fluid according to various embodiments of the present disclosure may include seawater, aqueous solutions wherein the salt concentration is less than that of sea water, or aqueous solutions wherein the salt concentration is greater than that of sea water. The salinity of seawater may range from about 1 percent to about 4.2 percent salt by weight based on total volume of seawater. The solutions, depending on the source of the seawater (ranging, for example, from the seawater from the Beaufort Sea in summer, when the seawater is relatively diluted due to melting of first-year ice, to the seawater from the Arabian Sea in summer, when the seawater is relatively concentrated due to evaporation of water), typically contain metal salts, such as but not limited to, transition metal salts, alkali metal salts, alkaline earth metal salts, and mixtures thereof. Exemplary salts include halides of zinc, calcium, and mixtures thereof. For example, the solution can include zinc halide, such as zinc bromide or zinc chloride or both, optionally in combination with calcium bromide or calcium chloride or both. Salts that may be found in seawater include, but are not limited to, sodium, calcium, aluminum, magnesium, potassium, strontium, and lithium salts of chlorides, bromides, carbonates, iodides, chlorates, bromates, formates, sulfates, silicates, phosphates, nitrates, oxides, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium. The brine solution can include the salts in conventional amounts, generally ranging from about 1% to about 80%, and preferably from about 20% to about 60%, based on the total weight of the solution, although as the skilled artisan will appreciate, amounts outside of this range can be used as well. In a particular embodiment, the brine may be a $CaCl_2$ and/or $CaBr_2$ brine.

Further, embodiments of the present disclosure may further use "specialty" brines that include at least one alkali metal salt of a transition metal oxy-anion or polyoxy-anion, such as, for example, an alkali metal polytungstate, an alkali metal heteropolytungstate, an alkali metal polymolybdate or an alkali metal heteropolymolybdate.

Each of the direct emulsions, the invert emulsion fluids and water based fluids of the present invention may further contain additional chemicals depending upon the end use of the fluid so long as they do not interfere with the functionality of the fluids described herein. For example, wetting agents, organophilic clays, viscosifiers, fluid loss control agents, surfactants, dispersants, interfacial tension reducers, pH buffers, mutual solvents, thinners, thinning agents, scale inhibition agents, corrosion inhibition agents, cleaning agents and a wide variety of the other components known to one of skill in the art may be added to the fluid compositions of this invention for additional functional properties. The addition of such agents and the reasons for doing so should be well known to one of ordinary skill in the art of formulating drilling fluids (also known as drilling muds), completion fluids, spacer fluids, clean-up fluids, fracturing fluids, and other similar wellbore fluids. In selecting these other components, one must take into account the type of fluid being created (i.e. water-based v. direct emulsion v. invert emulsion), the components of any filter cake on the wellbore walls, the downhole conditions, etc. Routine laboratory testing will provide guidance as to which components are helpful or detrimental to achieving the desired results.

In embodiments where a water soluble polar organic solvent is utilized, the water soluble polar organic solvent should be at least partially soluble in an oleaginous fluid, but should also have partial solubility in an aqueous fluid. The polar organic solvent component of the present invention may be a mono-hydric, di-hydric or poly-hydric alcohol or a mono-hydric, di-hydric, or poly-hydric alcohol having poly-functional groups. Examples of such compounds include aliphatic diols (i.e., glycols, 1,3-diols, 1,4-diols, etc.), aliphatic polyols (i.e., tri-ols, tetra-ols, etc.), polyglycols (i.e., polyethylenepropylene glycols, polypropylene glycol, polyethylene glycol, etc.), glycol ethers (i.e., diethylene glycol ether, tri-ethylene glycol ether, polyethylene glycol ether, etc.) and other such similar compounds that may be found useful in the practice of the present invention. In one preferred embodiment, the water soluble organic solvent is a glycol or glycol ether, such as ethylene glycol mono-butyl ether (EGMBE). Other glycols or glycol ethers may be used in the present invention so long as they are at least partially miscible with water.

In an illustrative embodiment, an oleaginous-containing carrier fluid is desired with a higher density than available from the oleaginous fluid alone. Thus, a weighting agent is utilized to increase the density of the overall fluid so as to match that of the drilling fluid and to provide sufficient hydrostatic head so that the well can remain under control. Preferably a high density brine containing salts of alkali and alkaline earth metals may be used to weight-up the fluids disclosed herein. For example, brines formulated with high concentrations of sodium, potassium, or calcium salts of the halides, formate, acetate, nitrate, and the like; cesium salts of formate, acetate, nitrate, and the like, as well as other compounds that should be well known to one of skill in the art, can be used as solids free weighting agents. The selection of a weighting agent may partially depend upon the desired density of the carrier fluid, as known by one of ordinary skill in the art.

The carrier fluids of the present disclosure may optionally include a visocisifiers, including natural or biopolymers in addition to synthetic polymer. Such "natural" polymers include HEC, derivatized HEC, guars, derivatized guars, starches, derivatized starches, scleroglu cans, wellan gums, locust bean gum, karaya gum, gum tragacanth, carrageenans, alginates, gum arabic, and biopolymers, such as, for example that derived from fermentation with *xanthomonas campestris*, and other similar polymers including ECF-612, which is commercially available from M-I LLC, Houston, Tex., and described in U.S. Patent Application Ser. No. 60/894,363, which is assigned to the present assignee and herein incorporated by reference in its entirety.

Further, embodiments of the present disclosure may also use a number of "synthetic" polymers, either exclusive of the aforementioned "natural" polymers or in combination therewith. "Synthetic" polymers include poly(ethylene glycol) (PEG), poly(diallyl amine), poly(acrylamide), poly(acrylonitrile), poly(vinyl acetate), poly(vinyl alcohol), poly(aminomethylpropylsulfonate [AMPS]), poly(vinyl amine), poly(vinyl sulfonate), poly(styryl sulfonate), poly(acrylate), poly (methyl acrylate), poly(methacrylate), poly(methyl methacrylate), poly(vinylpyrrolidone), poly(vinyl lactam), co-, ter-, and quater-polymers of the following co-monomers: ethylene, butadiene, isoprene, styrene, divinylbenzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinylpyrrolidone, vinyl lactam and other similar polymers.

Organophilic clays, normally amine treated clays, may be useful as viscosifiers and/or emulsion stabilizers in the fluid composition of the present invention. Other viscosifiers, such as oil soluble polymers, polyamide resins, polycarboxylic acids and soaps may also be useful. The amount of viscosifier used in the composition can vary upon the end use of the composition. However, normally about 0.1% to 6% by weight range is sufficient for most applications. VG-69™ and VG-PLUS™ and VG-Supreme are organoclay materials distributed by M-I, L.L.C., Houston, Tex., and Versa-HRP™ is a polyamide resin material manufactured and distributed by M-I, L.L.C., that may be used in this invention. Other examples of commercially available compounds include the Bentone™ line of products produced by Rheox as well as similar such materials widely known and available in the drilling fluids industry.

Wetting agents that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art. However, when used with the invert emulsion fluids that undergo a pH controlled phase change, the use of fatty acid wetting agents should be minimized so as to not adversely affect the reversibility of such invert emulsions as disclosed herein. Faze-Wet™, VersaCoat™, SureWet™, Versawet™ and Versawet™ NS are examples of commercially available wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Suitable thinners that may be used in the carrier fluids disclosed herein include, for example, lignosulfonates, modified lignosulfonates, polyphosphates, tannins, and low molecular weight polyacrylates. Thinners are typically added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing fluid properties at elevated temperatures.

The inclusion of cleaning agents in the fluids disclosed herein should be well known to one of skill in the art. A wide variety of synthetic and natural product derived cleaning agents may be used. For example, a common natural product derived cleaning agent is d-limonene. The cleaning ability of d-limonene in well drilling applications is disclosed in U.S. Pat. No. 4,533,487, and in combination with various specialty surfactants in U.S. Pat. No. 5,458,197, the contents of which are incorporated herein.

In a particular embodiment, a water-based carrier fluid may be prepared by adding water (up to 50 percent by volume of the final carrier fluid) to a brine (approximately 30 to 60 percent by volume), an oleaginous fluid (up to 50 percent by volume), then an alkyl glycoside (up to 20 percent by volume), and optionally an acidic buffering agent (up to 30 percent by volume). Optionally, a scale inhibitor may be added either after the acidic buffering agent or after the emulsifier, and a viscosifier may be added prior to the acidic buffering agent.

In other embodiments, the methods used in preparing each of the water-based, direct, and invert emulsion carrier fluids used in the methods of the present disclosure are not critical. Specifically, with respect to the invert emulsion fluids, conventional methods can be used to prepare the invert emulsion fluids in a manner analogous to those normally used to prepare oil-based drilling fluids. In one representative procedure, a desired quantity of oleaginous fluid, such as C16-C18 internal olefin, is mixed with the alkyl glycoside, and optional components, such as a viscosifying agent and a wetting agent. The internal non-oleaginous phase may be prepared by combining a polar organic co-solvent, and a hydrolyzable ester into the selected brine with continuous mixing. An invert emulsion of the present invention is formed by vigorously agitating, mixing, or shearing the oleaginous fluid and the non-oleaginous fluid in a conventional manner to form the invert emulsion.

Use of Carrier Fluid in Wellbore

Specific techniques and conditions for pumping a gravel pack composition into a well are known to persons skilled in this field. The conditions which can be used for gravel-packing in the present invention include pressures that are above fracturing pressure, particularly in conjunction with the Alternate Path Technique, known for instance from U.S. Pat. No. 4,945,991, and according to which perforated shunts are used to provide additional pathways for the gravel pack slurry. Furthermore, certain oil based gravel pack compositions of the present invention with relatively low volume internal phases (e.g., discontinuous phases) can be used with alpha- and beta-wave packing mechanisms similar to water packing.

Further, a wellbore contains at least one aperture, which provides a fluid flow path between the wellbore and an adjacent subterranean formation. In an open hole completed well, the wellbore's open end, that is abutted to the open hole, may be the at least one aperture. Alternatively, the aperture can comprise one or more perforations in the well casing. At least a part of the formation adjacent to the aperture has a filter cake coated on it, formed by drilling the wellbore with either a water- or oil-based wellbore fluid that deposits on the formation during drilling operations and comprises residues of the drilling fluid. The filter cake may also comprise drill solids, bridging/weighting agents, surfactants, fluid loss control agents, and viscosifying agents, etc. that are residues left by the drilling fluid.

Prior to production, breaker fluids may be used in cleaning the filtercake from a wellbore that has been drilled with either a water-based drilling mud or an invert emulsion based drilling mud. Breaker fluid are typically circulated into the wellbore, contacting the filter cake and any residual mud present downhole, may be allowed to remain in the downhole environment until such time as the well is brought into production. The breaker fluids may also be circulated in a wellbore that is to be used as an injection well to serve the same purpose (i.e. remove the residual mud and filter cake) prior to the well being used for injection of materials (such as water surfactants, carbon dioxide, natural gas, etc. . . . ) into the subterranean formation. Thus, the fluids disclosed herein may be designed to form two phases, an oil phase and a water phase, following dissolution of the filtercake which can easily produced from the wellbore upon initiation of production. Regardless of the fluid used to conduct the under-reaming operation, the fluids disclosed herein may effectively degrade the filtercake and substantially remove the residual drilling fluid from the wellbore upon initiation of production.

As an example of a commercially available oil based drilling fluid, FAZEPRO™ reservoir drilling fluid (available from M-I LLC, Houston, Tex.) is an oil-external emulsion system that can be inverted to water-external emulsion if it is exposed to pH less than about 7 or 8. When the filter cake is exposed, for example, to an acidic solution, the emulsion inverts and the solid particles therein (e.g., $CaCO_3$, barite, etc.) become water-wet and thus subject to removal through dissolution. Thus, the carrier fluids of the present disclosure comprising acidic aqueous phases may be used to pack gravel, while removing at least a portion of a filter cake that comprises residues of the FAZEPRO™ drilling fluid.

It should be appreciated that the amount of delay between the time when a breaker fluid is introduced to a well and the time when the fluids have had the desired effect of breaking/degrading/dispersing the filter cake may depend on several variables. One of skill in the art should appreciate that factors such as the downhole temperature, concentration of the components in the breaker fluid, pH, amount of available water, filter cake composition, etc. may all have an impact. For example downhole temperatures can vary considerably from 100° F. to over 400° F. depending upon the formation geology and downhole environment. However, one of skill in the art via trial and error testing in the lab should easily be able to determine and thus correlate downhole temperature and the time of efficacy of for a given formulation of the breaker fluids disclosed herein. With such information one can predetermine the time period necessary to shut-in a well given a specific downhole temperature and a specific formulation of the breaker fluid.

However it should also be appreciated that the breaker fluid formulation itself and thus the fluid's chemical properties may be varied so as to allow for a desirable and controllable amount of delay prior to the breaking of invert emulsion filter cake for a particular application. In one embodiment, the amount of delay for an invert emulsion filter cake to be broken with a water-based displacement fluid according to the present invention may be greater than 1 hour. In various other embodiments, the amount of delay for an invert emulsion filter cake to be broken with a water-based displacement fluid according to the present invention may be greater than 3 hours, 5 hours, or 10 hours. Thus the formulation of the fluid can be varied to achieve a predetermined break time and downhole temperature.

One of skill in the art should appreciate that in one embodiment, the amount of delay for an water based filter cake to be broken with a water based breaker fluid may be greater than 15 hours. In various other embodiments, the amount of delay for an water-based filter cake to be broken with a water based breaker fluid may be greater than 24 hours, 48 hours, or 72 hours. In second embodiment, the amount of delay for an invert emulsion filter cake to be broken with a water-based breaker fluid may be greater than 15 hours. In various other embodiments, the amount of delay for an invert emulsion filter cake to be broken with a water based breaker fluid may be greater than 24 hours, 48 hours, or 72 hours. In a third embodiment, the amount of delay for an invert emulsion filter cake to be broken with an invert emulsion displacement fluid may be greater than 15 hours. In various other embodiments, the amount of delay for an invert emulsion filter cake to be broken with an invert emulsion displacement fluid may be greater than 24 hours, 48 hours, or 72 hours.

EXAMPLES

A gravel pack carrier fluid according to embodiments disclosed herein is prepared by mixing the ingredients as formulated in Table 1 on a Silverson Mixer at 8000 rpm. ESCAID 110 is a desulfurized hydrogenated kerosene available from Exxon Company USA (Houston, Tex.). The brine is a potassium formate brine having a specific gravity of 1.56. The alkyl glycoside is SAFE-SURF WN, a blend of anionic and nonionic glucose-based surfactants, available from M-I LLC (Houston, Tex.).

TABLE 1

| Carrier Fluid Component | Amount |
|---|---|
| ESCAID 110 | 32 volume % |
| Brine | 68 volume % |
| Alkyl Glycoside | 5% v/v |

The resulting carrier fluid has a density of approximately 11.0 pounds per gallon. The rheology of the resulting carrier fluid is measured using a Fann 35 viscometer at 120° F. and 300 rpm, resulting in a measured value of about 10. The electrical stability of the carrier fluid is measured (25 mL CRYSTAL®), returning a value of about 5.

Carrier fluid stability is measured by keeping 50 mL of the fluid sample under static conditions in a measuring cylinder and observing the amount of phase separation (defined herein as separation of the dispersed oil/water phases and/or settling of suspended particles) over time. Testing of the carrier fluid indicates that the fluid is a stable suspension for a time period of at least 120 hours from formation, measured at room temperature and pressure, the carrier fluid exhibiting essentially no phase separation during that time period.

As described above, gravel pack carrier fluids according to embodiments disclosed herein may provide for efficient deposition of gravel at or adjacent to the open hole to establish a fluid flow path between the wellbore and the formation. This method may be useful in wellbores that are drilled with either water- or oil-based reservoir drilling fluids. The fluids of the present disclosure have several benefits as compared to prior art gravel packing methods and carrier fluids, including excellent stability, showing no phase separation over times of 120 hours or greater. Additionally, gravel pack carrier fluids according to embodiments disclosed herein may enhance wellbore cleanup by introducing an alkyl glycoside surfactant to the wellbore during the gravel pack operation.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method of gravel packing a hole in a subterranean formation having a filter cake coated on the surface thereof, comprising:
   injecting into the hole a gravel pack composition comprising gravel and a carrier fluid comprising a base fluid and at least one alkyl glycoside;
   wherein the alkyl glycoside has the formula RO—$(R'O)_xZ_y$, where the letter O represents an oxygen atom; R represents a monovalent alkyl radical containing from 8 to 16 carbon atoms; R' represents a divalent alkyl radical containing 2 to 4 carbon atoms; x represents the number of oxy-alkylene units in the alkyl glycoside varying from 0 to about 12; Z represents a saccharide moiety containing 5 or 6 carbon atoms, and y represents the number of saccharide units in the glycoside, and is in the range from 1.3 to 1.8.

2. The method of claim 1, wherein the alkyl glycoside has an hydrophilic lipophilic balance of about 9.5 to about 15.

3. The method of claim 1, wherein the carrier fluid further includes a weighting agent that is a high density brine containing water soluble salts of alkali and alkaline earth metals.

4. The method of claim 3, wherein the high density brine forms the continuous phase of a direct emulsion fluid.

5. The method of claim 4, wherein the direct emulsion fluid has a discontinuous phase selected from oleaginous fluids in the group consisting of diesel oil, mineral oil, synthetic oils, fatty acid ester based synthetic oils, polyolefin based synthetic oils, saturated and unsaturated polyalpha olefins, saturated and unsaturated long chain internal olefins, polydiorganosiloxanes, siloxanes or organo-siloxanes, and mixtures thereof.

6. The method of claim 1, wherein the carrier fluid has at least one of:
   a density of at least 11 pounds per gallon; and
   a Fann 35 viscometer value of 10 or less when measured at 300 rpm and 120° F.

7. The method of claim 1, wherein the gravel pack composition is a stable suspension, exhibiting essentially no phase separation for at least 120 hours as measured at room temperature and pressure.

8. The method of claim 1, wherein the carrier fluid further comprises a scale inhibitor.

9. The method of claim 1, further comprising:
   allowing the formation fluids to enter into the well; and
   producing fluids from the well.

10. The method of claim 1,
    wherein the carrier fluid comprises:
    a base fluid having a non-oleaginous external phase and an oleaginous internal phase.

11. A solution, comprising:
    an aqueous fluid;
    at least one alkyl glycoside; and
    gravel;
    wherein the alkyl glycoside has the formula RO—$(R'O)_xZ_y$, where the letter O represents an oxygen atom; R represents a monovalent alkyl radical containing from 8 to 16 carbon atoms; R' represents a divalent alkyl radical containing 2 to 4 carbon atoms; x represents the number of oxy-alkylene units in the alkyl glycoside varying from 0 to about 12; Z represents a saccharide moiety containing 5 or 6 carbon atoms, and y represents the number of saccharide units in the glycoside, and is in the range from 1.3 to 1.8.

12. The solution of claim 11, further comprising a weighting agent.

13. The solution of claim 11, further comprising:
at least one selected from a wetting agent, a cleaning agent, a viscosifying agent, a fluid loss control agent, a dispersant, an interfacial tension reducer, a pH buffer, a thinner, defoamer, bactericide, and a surfactant.

14. The solution of claim 11, wherein the aqueous fluid is selected from fresh water, sea water, a brine containing organic and/or inorganic dissolved salts, liquids containing water-miscible organic compounds and combinations thereof.

15. The solution of claim 11, wherein the aqueous fluid forms the continuous phase of a direct emulsion fluid.

16. The solution of claim 15, wherein the direct emulsion fluid has a discontinuous phase selected from oleaginous fluids in the group consisting of diesel oil, mineral oil, synthetic oils, fatty acid ester based synthetic oils, polyolefin based synthetic oils, saturated and unsaturated polyalpha olefins, saturated and unsaturated long chain internal olefins, polydiorganosiloxanes, siloxanes or organo-siloxanes, and mixtures thereof.

17. The solution of claim 11, wherein the solution is a stable suspension, exhibiting essentially no phase separation for at least 120 hours as measured at room temperature and pressure.

18. A solution, comprising:
an aqueous fluid;
at least one alkyl glycoside; and
a proppant;
wherein the alkyl glycoside has the formula $RO\text{—}(R'O)_x Z_y$, where the letter O represents an oxygen atom; R represents a monovalent alkyl radical containing from 8 to 16 carbon atoms; R' represents a divalent alkyl radical containing 2 to 4 carbon atoms; x represents the number of oxy-alkylene units in the alkyl glycoside varying from 0 to about 12; Z represents a saccharide moiety containing 5 or 6 carbon atoms, and y represents the number of saccharide units in the glycoside, and is in the range from 1.3 to 1.8.

19. The solution of claim 18, wherein the proppant comprises at least one of sand and a ceramic.

20. The solution of claim 18, wherein the solution is a stable suspension, exhibiting essentially no phase separation for at least 120 hours as measured at room temperature and pressure.

* * * * *